UNITED STATES PATENT OFFICE.

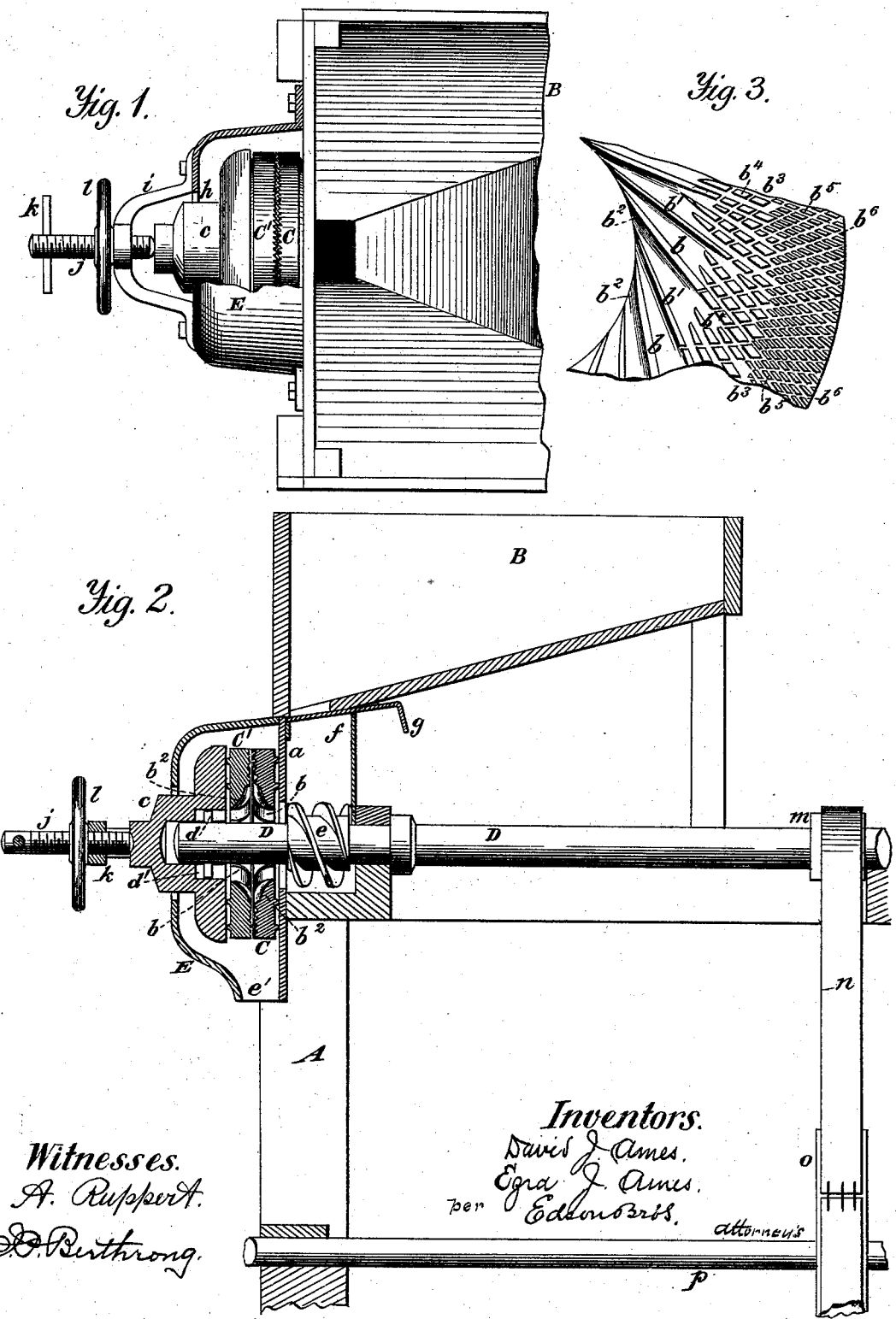

DAVID J. AMES AND EZRA J. AMES, OF AUSTIN, MINNESOTA.

IMPROVEMENT IN GRINDING-MILLS.

Specification forming part of Letters Patent No. 203,100, dated April 30, 1878; application filed January 23, 1878.

*To all whom it may concern:*

Be it known that we, DAVID J. AMES and EZRA J. AMES, of Austin, in the county of Mower and State of Minnesota, have invented certain new and useful Improvements in Mill-Burrs; and we do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a plan view, partly broken away, of our improved mill-burr. Fig. 2 is a vertical longitudinal section thereof; and Fig. 3 is a detached face view of one of the burrs, parts being broken away.

Corresponding parts in the several figures are denoted by like letters.

This invention appertains to certain improvements in mill-burrs, by which the passage of the grain while being ground is retarded and the grain ground more finely, and the holding of one of the burrs in position and its relative adjustment with its fellow are effected to vary the fineness of the grinding of the grain, thus answering all the demands of the trade, or the purposes of a first-class burr.

The nature of this invention consists in providing the burrs with a series of tangential blades or ribs, crossed by a series of backward-cut grooves or channels, and of mechanism for applying pressure to the burrs, substantially as hereinafter more particularly set forth.

In the annexed drawing, A refers to an upright frame, and B to a hopper or chute mounted upon said frame, and into which the grain is placed and fed to the burrs disposed in position below the said chute. C is a stationary burr, fastened preferably to a plate, $a$, secured to one end of the frame A in any known way. C' is a rotating burr, facing the burr C and adjusted upon a shaft, D, passing through the eyes of the two burrs and entering a socketed cap or hub, $c$, fastened to the burr C'. The burrs C C' are provided around their eyes with a series of tangential blades or ribs, $b$ $b$, between which are a series of lesser similar blades or ribs, $b'$ $b'$, and deeply-cut grooves or channels $b^2$ $b^2$, sloping toward the eyes of the burrs, which serve to guide the grain crushed by the said blades or ribs toward the finer crushing or grinding surfaces of the burrs. Between the outer extremities of the deep-cut channels or grooves $b^2$ $b^2$ and a point, $b^3$, upon the faces of the burrs are a series of radial ribs, $b^4$, and beyond the point $b^3$ are a series of finer and more closely-arranged ribs, $b^5$, both of which series and the ribs or blades $b$ $b$ beyond the outer extremities of the channels $b^2$ are divided up by a series of backward or crosscut channels or grooves, $b^6$ $b^6$, converting the same into two series of teeth or grinding-surfaces, one finer than the other. The effect of the two series of grinding-surfaces or notched ribs $b^4$ $b^5$ upon the crushed or ground grain is to retard it in its passage, and to still further reduce it to the required fineness.

The shaft D, which is journaled upon the frame A, is provided upon that end entering the socketed cap or hub $c$ of the burr C' with a transverse pin, $d$, which enters similar slots $d'$ $d'$ in opposite sides of the socket of said cap or hub, to enable the burr C' to turn with the shaft D. The socket and slots $d'$ $d'$ in the cap $c$ are elongated to permit of the horizontal adjustment of the said cap against the burr C' when acted upon by the screw $j$. Upon this shaft is a worm or screw, $e$, to feed the grain to the burrs, between which it is ground, and discharged through a short spout, $e'$. The grain falls from the hopper B upon the screw or worm $e$ of the shaft D through a pipe, $f$. At the intersection of the pipe $f$ with the hopper B is a slide or valve, $g$, to regulate or cut off the passage of the grain to the feeding-screw $e$.

E is a case or covering for the burrs, which is fastened preferably to the plate $a$ of the burr C, and forms at its lower end with said plate the short spout $e'$ above referred to, through which the ground grain is discharged. The outer end of the case E is provided with an opening, $h$, opposite or over which is secured a bridge or support, $i$, through which passes a screw, $j$, bearing against the cap or hub $c$ of the rotating burr C', and by turning which in the required direction the said burr will be held in contact with its fellow, and the relative adjustment of the two burrs can be effected to vary the fineness of the grinding of the grain. The said screw is provided with a lever, $k$, or hand-wheel $l$ for its manipulation. The screw-feeding shaft D is driven by a pulley, $m$, thereon and a belt, $n$, passing around a pulley, $o$, upon a shaft, $p$, journaled in the lower part of the frame A, and driven by any suitable motor. Any other suitable means may be used in lieu of that above mentioned to drive said shaft.

Having thus described our invention, what we claim, and desire to secure by Letters Patent, is—

1. A mill-burr provided with three series of ribs, $b$, $b^4$, and $b^5$, the two latter-mentioned series being arranged closer together, and divided up by the backward or crosscut grooves or channels $b^6$ $b^6$, substantially as and for the purpose set forth.

2. The shaft D, passing through the burrs C C′, provided with a pin, $d$, in combination with the driving hub or cap $c$, recessed sufficiently to enable said parts to be properly adjusted, substantially as shown and described.

In testimony that we claim the foregoing as our own we hereunto affix our signatures in presence of two witnesses.

DAVID J. AMES.
EZRA J. AMES.

Witnesses:
JOHN M. GREENMAN,
D. F. MORGAN.